US009172973B2

(12) United States Patent
Zhang et al.

(10) Patent No.: US 9,172,973 B2
(45) Date of Patent: Oct. 27, 2015

(54) METHOD AND SYSTEM FOR MOTION ESTIMATION IN A VIDEO ENCODER

(75) Inventors: Bo Zhang, Westford, MA (US); Stephen Gordon, North Andover, MA (US)

(73) Assignee: Broadcom Corporation, Irvine, CA (US)

(*) Notice: Subject to any disclaimer, the term of this patent is extended or adjusted under 35 U.S.C. 154(b) by 2008 days.

(21) Appl. No.: 11/096,825

(22) Filed: Apr. 1, 2005

(65) Prior Publication Data

US 2006/0222075 A1 Oct. 5, 2006

(51) Int. Cl.
*H04N 7/12* (2006.01)
*H04N 19/57* (2014.01)
*H04N 19/61* (2014.01)
*H04N 19/53* (2014.01)

(52) U.S. Cl.
CPC .............. *H04N 19/57* (2014.11); *H04N 19/53* (2014.11); *H04N 19/61* (2014.11)

(58) Field of Classification Search
CPC ........ H04N 19/53; H04N 19/57; H04N 19/61
USPC .................. 375/240, 240.01, 240.12, 240.14, 375/240.16; 348/699
See application file for complete search history.

(56) References Cited

U.S. PATENT DOCUMENTS 5,682,209 A * 10/1997 Borgwardt .................... 348/699
5,825,423 A * 10/1998 Jung ......................... 375/240.14
2001/0002921 A1* 6/2001 Bagni et al. ............. 375/240.16

* cited by examiner

*Primary Examiner* — Allen Wong
(74) *Attorney, Agent, or Firm* — Brinks Gilson & Lione

(57) ABSTRACT

Described herein is a method and system for motion estimation in a video encoder. There are two parts to the motion estimation. Coarse motion estimation generates a set of motion vectors for a current picture and at least one reference picture. Typically, coarse motion estimation operates on sub-sampled pictures. Fine motion estimation can refine coarse motion estimation results by searching interpolated video data in a region defined by the motion vectors from the coarse motion estimation.

18 Claims, 9 Drawing Sheets

METHOD AND SYSTEM FOR MOTION ESTIMATION IN A VIDEO ENCODER

RELATED APPLICATIONS

[Not Applicable]

FEDERALLY SPONSORED RESEARCH OR DEVELOPMENT

[Not Applicable]

MICROFICHE/COPYRIGHT REFERENCE

[Not Applicable]

BACKGROUND OF THE INVENTION

Video communications systems are continually being enhanced to meet requirements such as reduced cost, reduced size, improved quality of service, and increased data rate. Many advanced processing techniques can be specified in a video compression standard. Typically, the design of a compliant video encoder is not specified in the standard. Optimization of the communication system's requirements is dependent on the design of the video encoder.

The video encoding standard H.264 utilizes a combination of intra-coding and inter-coding. Intra-coding uses spatial prediction based on information that is contained in the picture itself. Inter-coding uses motion estimation and motion compensation based on previously encoded pictures. The encoding process for motion estimation consists of selecting motion data comprising a motion vector that describes a displacement applied to samples of a previously encoded picture. As the number of ways to partition a picture increases, this selection process can become very complex, and optimization can be difficult given the constraints of some hardware.

Limitations and disadvantages of conventional and traditional approaches will become apparent to one of ordinary skill in the art through comparison of such systems with the present invention as set forth in the remainder of the present application with reference to the drawings.

BRIEF SUMMARY OF THE INVENTION

Described herein are system(s) and method(s) for encoding video data, substantially as shown in and/or described in connection with at least one of the figures, as set forth more completely in the claims.

These and other advantages and novel features of the present invention will be more fully understood from the following description.

DETAILED DESCRIPTION OF THE INVENTION

According to certain aspects of the present invention, a system and method for motion estimation in a video encoder are presented. The invention can be applied to video data encoded with a wide variety of standards, one of which is H.264. An overview of H.264 will now be given. A description of an exemplary system for motion estimation in H.264 will also be given.

H.264 Video Coding Standard

The ITU-T Video Coding Experts Group (VCEG) and the ISO/IEC Moving Picture Experts Group (MPEG) drafted a video coding standard titled ITU-T Recommendation H.264 and ISO/IEC MPEG-4 Advanced Video Coding, which is incorporated herein by reference for all purposes. In the H.264 standard, video is encoded on a macroblock-by-macroblock basis. The generic term "picture" refers to frames and fields.

The specific algorithms used for video encoding and compression form a video-coding layer (VCL), and the protocol for transmitting the VCL is called the Network Access Layer (NAL). The H.264 standard allows a clean interface between the signal processing technology of the VCL and the transport-oriented mechanisms of the NAL, so source-based encoding is unnecessary in networks that may employ multiple standards.

By using the H.264 compression standard, video can be compressed while preserving image quality through a combination of spatial, temporal, and spectral compression techniques. To achieve a given Quality of Service (QoS) within a small data bandwidth, video compression systems exploit the redundancies in video sources to de-correlate spatial, temporal, and spectral sample dependencies. Statistical redundancies that remain embedded in the video stream are distinguished through higher order correlations via entropy coders. Advanced entropy coders can take advantage of context modeling to adapt to changes in the source and achieve better compaction.

An H.264 encoder can generate three types of coded pictures: Intra-coded (I), Predictive (P), and Bi-directional (B) pictures. An I picture is encoded independently of other pictures based on a transformation, quantization, and entropy coding. I pictures are referenced during the encoding of other picture types and are coded with the least amount of compression. P picture coding includes motion compensation with respect to another picture. A B picture is an interpolated picture that uses two reference pictures. The picture type I uses the exploitation of spatial redundancies while types P and B use exploitations of both spatial and temporal redundancies. Typically, I pictures require more bits than P pictures, and P pictures require more bits than B pictures.

Figure 1:
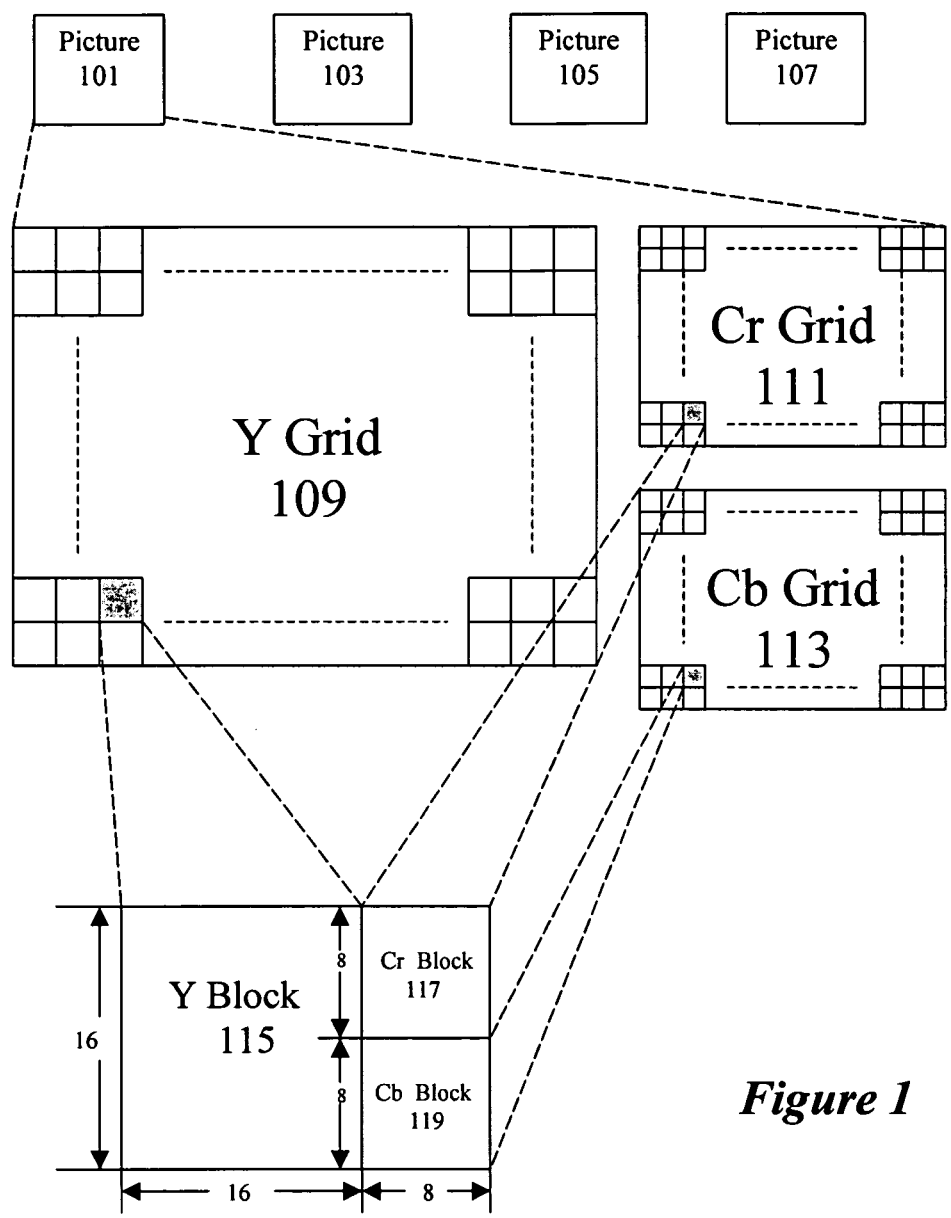
FIG. 1 is a block diagram of an exemplary picture in the H.264 coding standard in accordance with an embodiment of the present invention.

In FIG. 1 there is illustrated a block diagram of an exemplary picture 101. The picture 101 along with successive pictures 103, 105, and 107 form a video sequence. The picture 101 comprises two-dimensional grid(s) of pixels. For color video, each color component is associated with a unique two-dimensional grid of pixels. For example, a picture can include luma, chroma red, and chroma blue components. Accordingly, these components are associated with a luma grid 109, a chroma red grid 111, and a chroma blue grid 113. When the grids 109, 111, 113 are overlaid on a display device, the result is a picture of the field of view at the duration that the picture was captured.

Generally, the human eye is more perceptive to the luma characteristics of video, compared to the chroma red and chroma blue characteristics. Accordingly, there are more pixels in the luma grid 109 compared to the chroma red grid 111 and the chroma blue grid 113. In the H.264 standard, the chroma red grid 111 and the chroma blue grid 113 have half as many pixels as the luma grid 109 in each direction. Therefore, the chroma red grid 111 and the chroma blue grid 113 each have one quarter as many total pixels as the luma grid 109.

The luma grid 109 can be divided into 16×16 pixel blocks. For a luma block 115, there is a corresponding 8×8 chroma red block 117 in the chroma red grid 111 and a corresponding 8×8 chroma blue block 119 in the chroma blue grid 113. Blocks 115, 117, and 119 are collectively known as a macroblock that can be part of a slice group. Currently, sub-sampling is the only color space used in the H.264 specification. This means, a macroblock consist of a 16×16 luminance block 115 and two (sub-sampled) 8×8 chrominance blocks 117 and 118.

Figure 2:
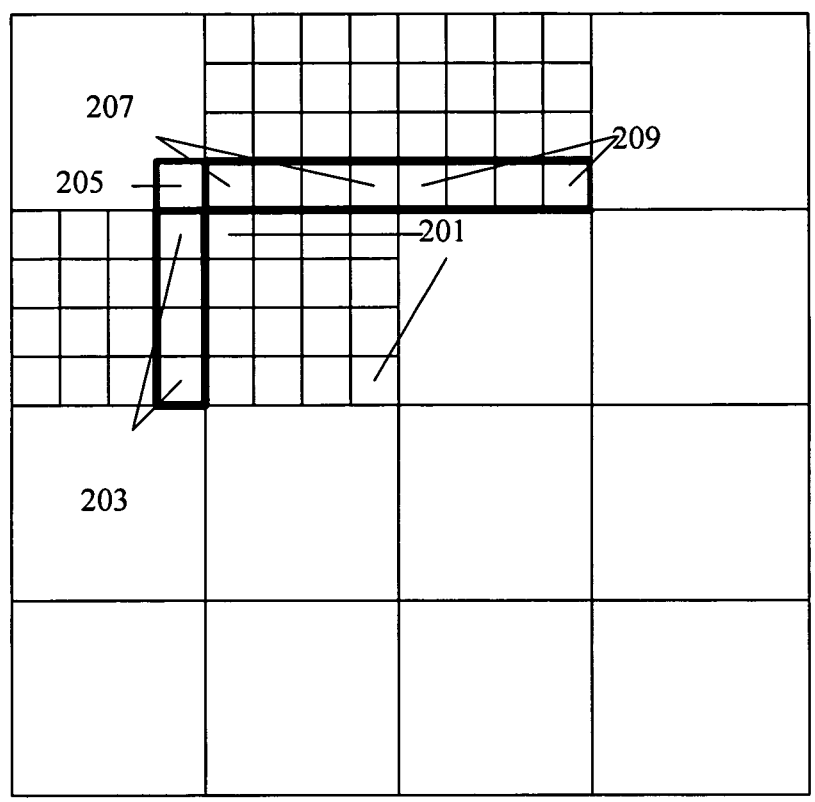
FIG. 2 is a block diagram describing spatially encoded macroblocks in accordance with an embodiment of the present invention.

Referring now to FIG. 2, there is illustrated a block diagram describing spatially encoded macroblocks. Spatial prediction, also referred to as intra-prediction, involves prediction of picture pixels from neighboring pixels. The pixels of a macroblock can be predicted, in a 16×16 mode, an 8×8 mode, or a 4×4 mode. A macroblock is encoded as the combination of the prediction errors representing its partitions.

In the 4×4 mode, a macroblock 201 is divided into 4×4 partitions. The 4×4 partitions of the macroblock 201 are predicted from a combination of left edge partitions 203, a corner partition 205, top edge partitions 207, and top right partitions 209. The difference between the macroblock 201 and prediction pixels in the partitions 203, 205, 207, and 209 is known as the prediction error. The prediction error is encoded along with an identification of the prediction pixels and prediction mode.

Figure 3:
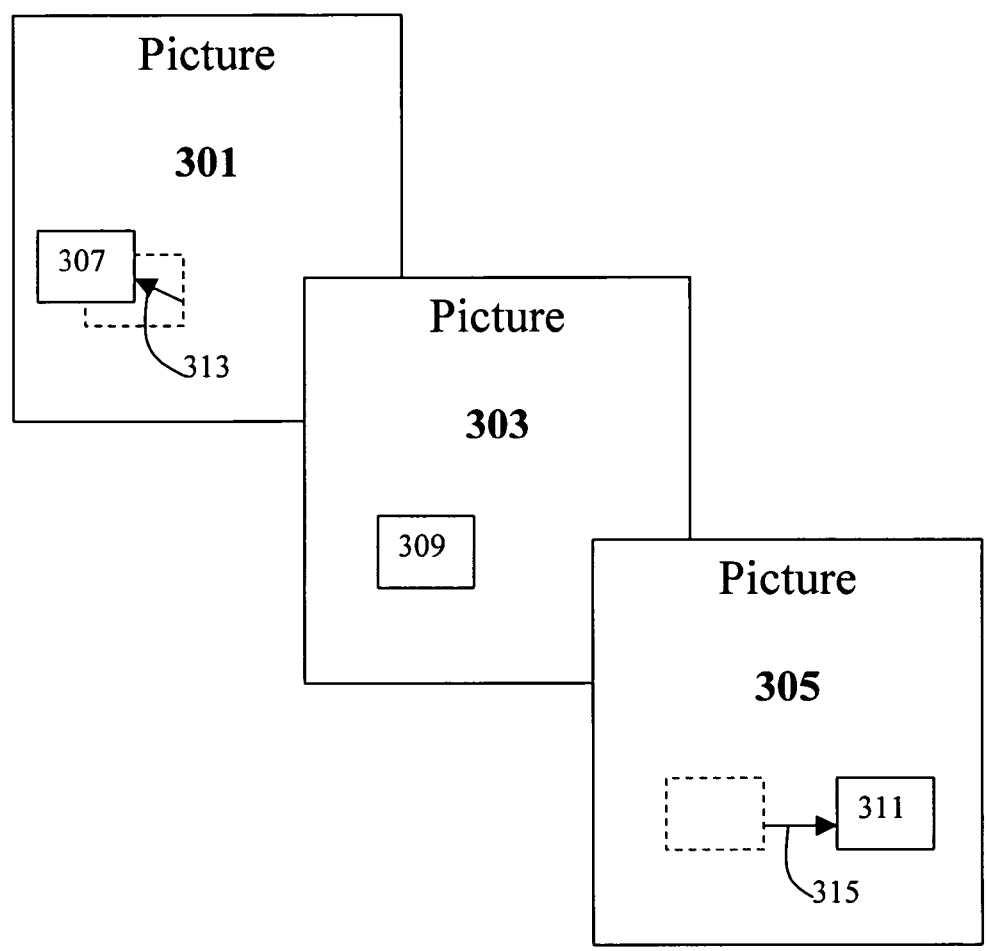
FIG. 3 is a block diagram describing temporally encoded macroblocks in accordance with an embodiment of the present invention.

Referring now to FIG. 3, there is illustrated a block diagram describing temporally encoded macroblocks. In bi-directional coding, a current partition 309 in the current picture 303 is predicted from a reference partition 307 in a previous picture 301 and a reference partition 311 in a latter arriving picture 305. Accordingly, a prediction error is calculated as the difference between the weighted average of the reference partitions 307 and 311 and the current partition 309. The prediction error and an identification of the prediction partitions are encoded. Motion vectors 313 and 315 identify the prediction partitions.

The weights can also be encoded explicitly, or implied from an identification of the picture containing the prediction partitions. The weights can be implied from the distance between the pictures containing the prediction partitions and the picture containing the partition.

Figure 4:
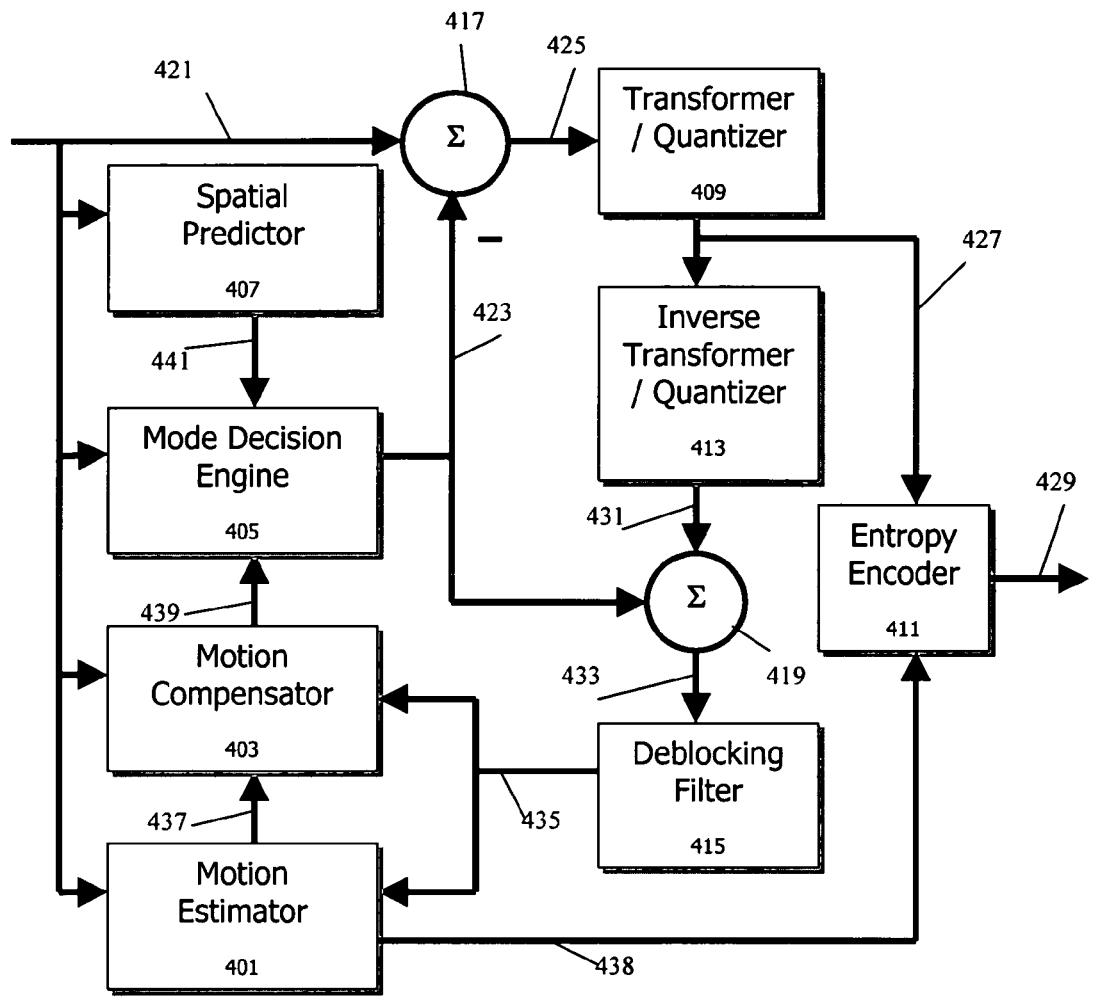
FIG. 4 is a block diagram of an exemplary video encoding system in accordance with an embodiment of the present invention.

Referring now to FIG. 4, there is illustrated a block diagram of an exemplary video encoder 400. The video encoder 400 comprises a motion estimator 401, a motion compensator 403, a mode decision engine 405, spatial predictor 407, a transformer/quantizer 409, an entropy encoder 411, an inverse transformer/quantizer 413, and a deblocking filter 415.

The spatial predictor 407 uses only the contents of a current picture 421 for prediction. The spatial predictor 407 receives the current picture 421 and produces a spatial prediction 441 corresponding to reference blocks as described in reference to FIG. 2.

Spatially predicted pictures are intra-coded. Luma macroblocks can be divided into 4×4 blocks or 16×16 blocks. There are 9 prediction modes available for 4×4 macroblocks and 4 prediction modes available for 16×16 macroblocks. Chroma macroblocks are 8×8 blocks and have 4 possible prediction modes.

In the motion estimator 401, the current picture 421 is estimated from reference blocks 435 using a set of motion vectors 437. The motion estimator 401 receives the current picture 421 and a set of reference blocks 435 for prediction. A temporally encoded macroblock can be divided into 16×8, 8×16, 8×8, 4×8, 8×4, or 4×4 blocks. Each block of a macroblock is compared to one or more prediction blocks in another picture(s) that may be temporally located before or after the current picture. Motion vectors describe the spatial displacement between blocks and identify the prediction block(s).

The motion compensator 403 receives the motion vectors 437 and the current picture 421 and generates a temporal prediction 439. Interpolation can be used to increase accuracy of motion compensation to a quarter of a sample distance. The prediction values at half-sample positions can be obtained by applying a 6-tap FIR filter or a bi-linear interpolator, and prediction values at quarter-sample positions can be generated by averaging samples at the integer- and half-sample positions. The prediction values for the chroma components are typically obtained by bi-linear interpolation. In cases where the motion vector points to an integer-sample position, no interpolation is required. Motion compensation runs along with the main encoding loop to allow intra-prediction macroblock pipelining.

The mode decision engine 405 will receive the spatial prediction 441 and temporal prediction 439 and select the prediction mode according to a sum of absolute transformed difference (SATD) cost that optimizes rate and distortion. A selected prediction 423 is output.

Once the mode is selected, a corresponding prediction error 425 is the difference 417 between the current picture 421 and the selected prediction 423. The transformer/quantizer 409 transforms the prediction error and produces quantized transform coefficients 427. In H.264, there are 52 quantization levels.

Transformation in H.264 utilizes Adaptive Block-size Transforms (ABT). The block size used for transform coding of the prediction error 425 corresponds to the block size used for prediction. The prediction error is transformed independently of the block mode by means of a low-complexity 4×4 matrix that together with an appropriate scaling in the quantization stage approximates the 4×4 Discrete Cosine Transform (DCT). The Transform is applied in both horizontal and vertical directions. When a macroblock is encoded as intra 16×16, the DC coefficients of all 16 4×4 blocks are further transformed with a 4×4 Hardamard Transform.

H.264 specifies two types of entropy coding: Context-based Adaptive Binary Arithmetic Coding (CABAC) and Context-based Adaptive Variable-Length Coding (CAVLC). The entropy encoder 411 receives the quantized transform coefficients 427 and produces a video output 429. In the case of temporal prediction, a set of picture reference indices 438 are entropy encoded as well.

The quantized transform coefficients 427 are also fed into an inverse transformer/quantizer 413 to produce a regenerated error 431. The original prediction 423 and the regenerated error 431 are summed 419 to regenerate a reference picture 433 that is passed through the deblocking filter 415 and used for motion estimation.

Figure 5:
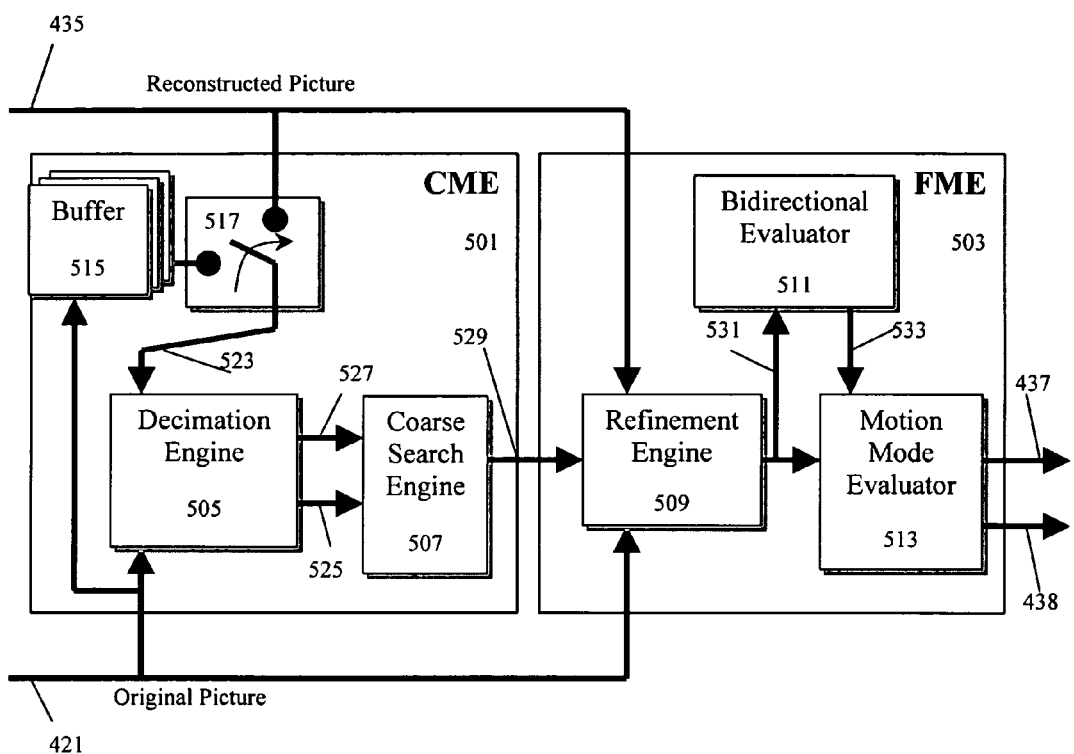
FIG. 5 is a block diagram of an exemplary motion estimator in accordance with an embodiment of the present invention.

Referring now to FIG. 5, a block diagram of an exemplary motion estimator 401 is shown. The motion estimator 401 comprises a coarse motion estimator 501 and a fine motion estimator 503.

Coarse Motion Estimator (CME) 501

The coarse motion estimator 501 comprises a decimation engine 505 and a costing engine 507 and may also comprise a buffer 513 and a selector 515. The coarse motion estimator 501 can run ahead of other blocks in the video encoder. For example, the coarse motion estimator 501 can process at least one macroblock row before the fine motion estimator 503.

The coarse motion estimator 501 can select 517 a reference picture 523 to be a reconstructed picture 435 or an original picture 421 that has been buffered 515. By using an original picture 421 as the reference picture 523, the coarse motion estimator 501 yields "true" motion vectors 529 as candidates for the fine motion estimator 503 and allows picture level pipelining.

The decimation engine 505 receives the current (original) picture 421 and one or more reference pictures 523. The decimation engine 505 produces a sub-sampled current picture 525 and one or more sub-sampled reference pictures 527. Sub-sampling can reduce the occurrence of spurious motion vectors that arise from an exhaustive search of small block sizes. The decimation engine 505 can sub-sample frames using a 2×2 pixel average. Typically, the coarse motion estimator 501 operates on macroblocks of size 16×16. After sub-sampling, the size is 8×8 for the luma grid and 4×4 for the chroma grids. Fields of size 16×8 can be sub-sampled in the horizontal direction, so a 16×8 field partition could be evaluated as size 8×8.

The coarse motion estimator 501 search can be exhaustive. The costing engine 507 determines a cost for motion vectors that describe the displacement from a section of a sub-sampled reference picture 527 to a macroblock in the sub-sampled current picture 525. The cost can be based on a sum of absolute difference (SAD). The output 529 of the costing engine 507 is one motion vector for every reference picture and macroblock combination. The selection is based on cost.

Fine Motion Estimator (FME) 503

The fine motion estimator 503 comprises a refinement engine 509, a bidirectional evaluator 511, and a motion mode evaluator 513. The fine motion estimator 503 can be non-causal, and can have a macroblock level pipeline that runs slightly ahead of (e.g. one or more macroblocks) the main encoding loop. CME results 529 from macroblocks that follow after a current macroblocks can be used in FME.

The refinement engine 509 can search all partitions. The refinement engine 509 can take advantage of various small partition sizes with a multiple candidate approach. Breaking causality helps a motion vector search for smaller partition sizes along moving edges. Macroblock level pipelining allows motion compensation and fine motion estimation to run independently.

The refinement engine 509 receives the current picture 421, reconstructed reference pictures 435, and motion vectors 529 from the CME. The motion vectors 529 that are based on sub-sampled macro-blocks can be described in terms of picture element (pel) resolution. Using 2×2 pixel averages may result in single or double pel resolution.

For each reference picture 435, refinement can be performed for macroblock partitions and sub-macroblocks partitions. For a refinement search of a partition in a macroblock, the refinement engine 509 can use, as candidates, the motion vectors 529 of the macroblock and up to eight neighboring macroblocks. The output 531 of the refinement engine 509 can be one or more motion vectors and the associated costs. Finer resolution can be achieved by interpolating partitions. Candidate elimination can be based on a cost for prediction that that results from displacing a portion of the reference picture according to the motion vector. Candidate elimination can also be based on CME results, FME results of previous macroblocks, and temporal distance between a macroblock and a reference section. An entire reference picture may be eliminated or candidates for each reference picture may be eliminated individually.

A difference between B and P pictures is that B pictures may be predicted by a weighted average of two motion-compensated prediction values. For each reference picture pair, the bidirectional evaluator 511 uses uni-directional motion vectors 531 decided in the refinement step. A motion vector set and an associated cost 533 for the prediction is output.

The motion mode evaluator 513 makes estimation mode decisions and outputs data that includes the motion vectors 437 and associated reference indices 438 for each macroblock, macroblock partition and sub-macroblock partition. Uni-directional or bi-directional modes can also be indicated.

The motion mode evaluator 513 can make mode decisions in the following order: 1) sub-macroblock partition mode for each reference picture, 2) uni-directional prediction among all reference pictures, 3) bi-direction prediction among all reference picture pairs, 4) overall prediction between uni-direction and bi-direction predictions, and 5) macroblock partition mode.

Figure 6:
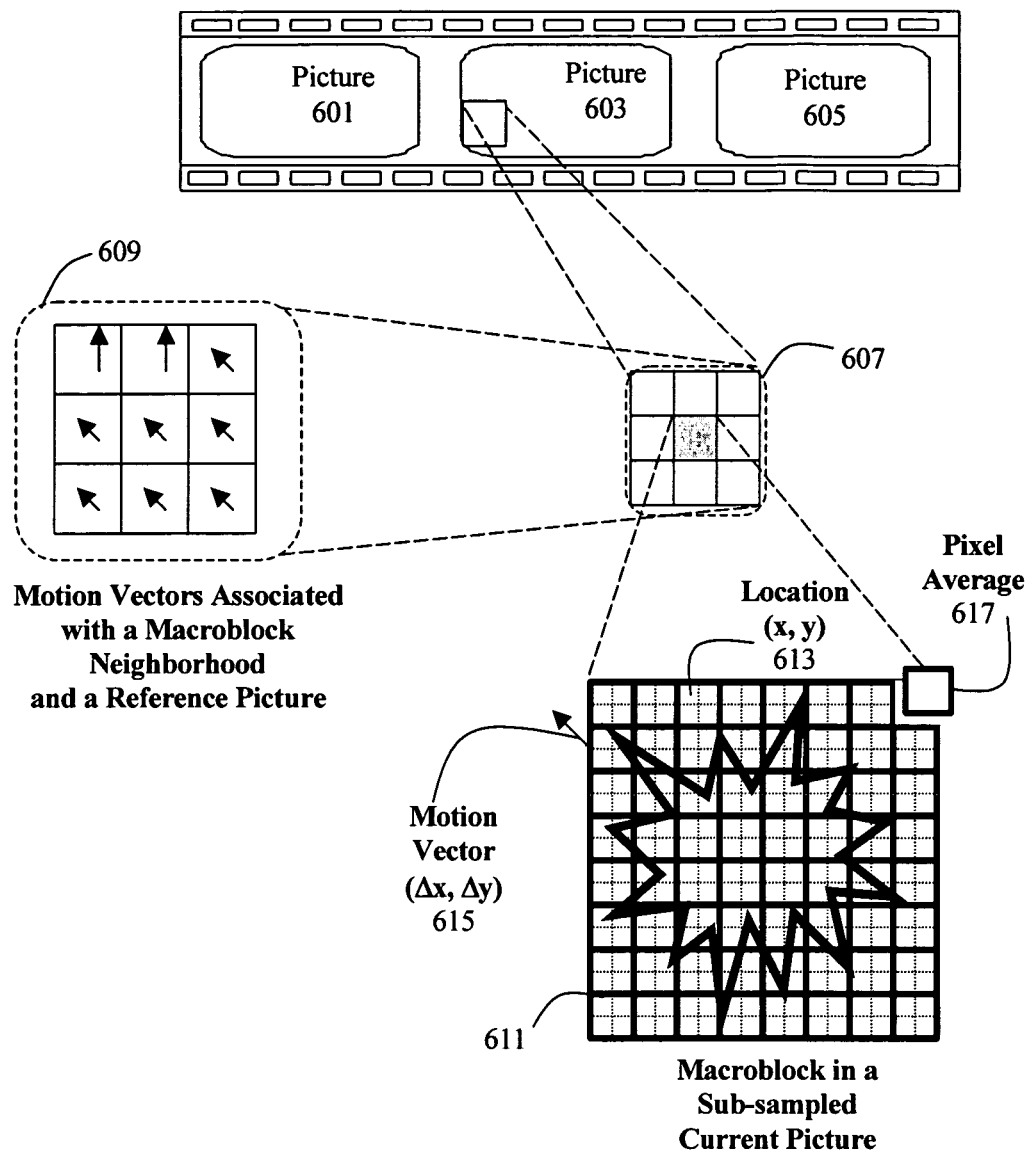
FIG. 6 is a block diagram of a current picture in accordance with an embodiment of the present invention.
Figure 7:
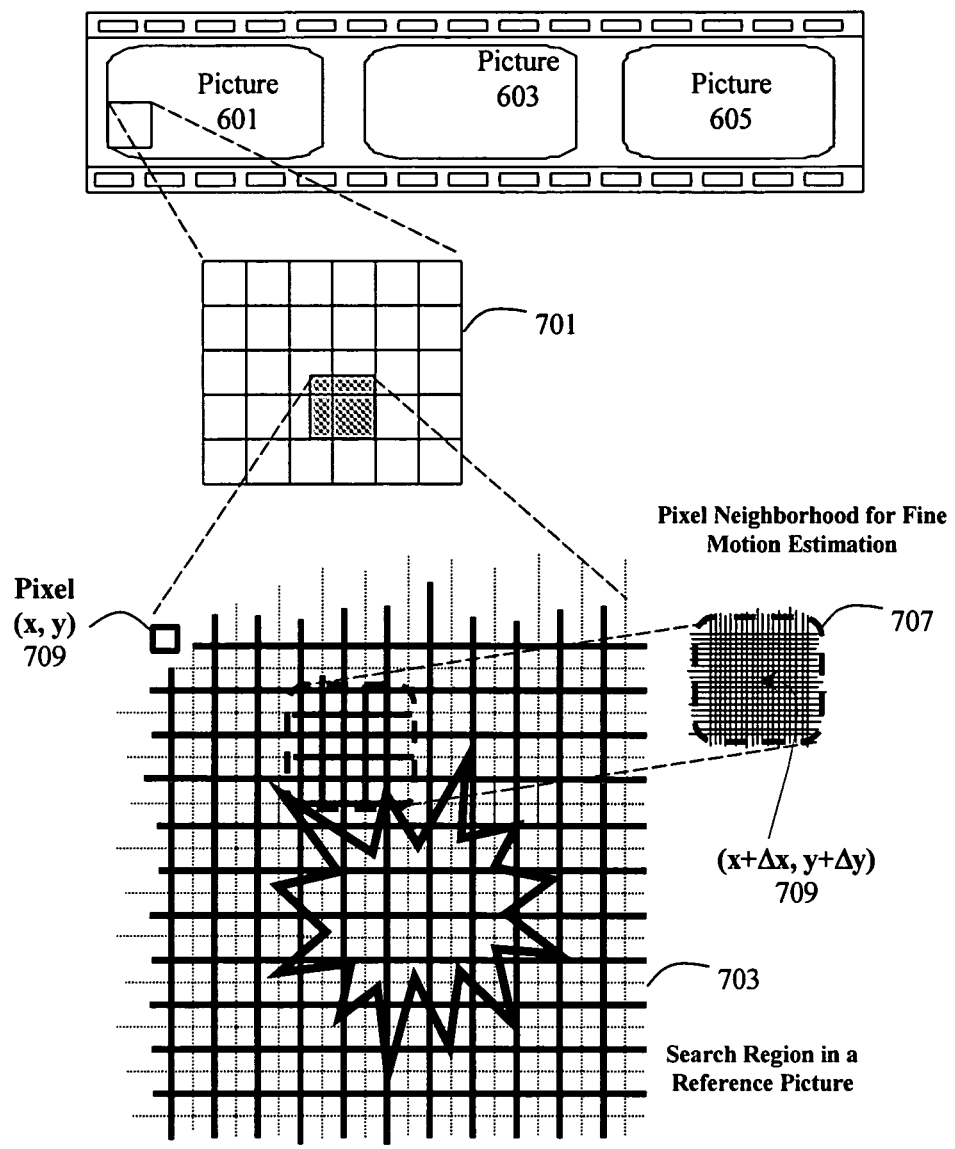
FIG. 7 is a block diagram of a reference picture in accordance with an embodiment of the present invention.

Refer now to FIG. 6 and FIG. 7. FIG. 6 is a block diagram of a current picture, and FIG. 7 is a block diagram of a reference picture. Three pictures 601, 603, and 605 are shown. The reference picture is at 601 and the current picture is at 603. A coarse motion estimator decimates a portion 611 of the current picture 603 and a reference region 703 in the reference picture 601. An element of the sub-sampled portion 611 is a pixel average 617. A cost engine evaluates a correlation between the sub-sampled portion 611 and the reference region 703. A motion vector ($\Delta x$, $\Delta y$) 615 represents the displacement from the sub-sampled portion 611. A location (x, y) 613 corresponds to a location (x+$\Delta x$, y+$\Delta y$) 709 in the reference region 703. To determine a cost for motion vector ($\Delta x$, $\Delta y$) 615, location (x, y) 613 is compared to location (x+$\Delta x$, y+$\Delta y$) 709.

A fine motion estimator receives the motion vectors 609 associated with the macroblock 611 and neighboring macroblocks 607. The fine motion estimator will search a range in the reference region 703 defined by the motion vectors 609. To determine a cost during fine motion estimation, a picture is interpolated (e.g. to quarter pel resolution). The motion vector ($\Delta x$, $\Delta y$) 615 that was derived in coarse motion estimation, associates location (x, y) 613 with an interpolated neighborhood of pixels 707 around location (x+$\Delta x$, y+$\Delta y$) 709. When cost is computed for macroblock and sub-macroblock partitions, reference portions in the reference region 703 can correspond to motion vector ($\Delta x$, $\Delta y$) 615 and motion vectors (n+$\Delta x$, m+$\Delta y$) where m and n can vary, for example, from −2 to +2 pels with quarter pel resolution. Cost may also be determined by a set of pixels in the reference picture with coordinates corresponding to the current picture. No displacement is referred to as motion vector zero.

Figure 8:
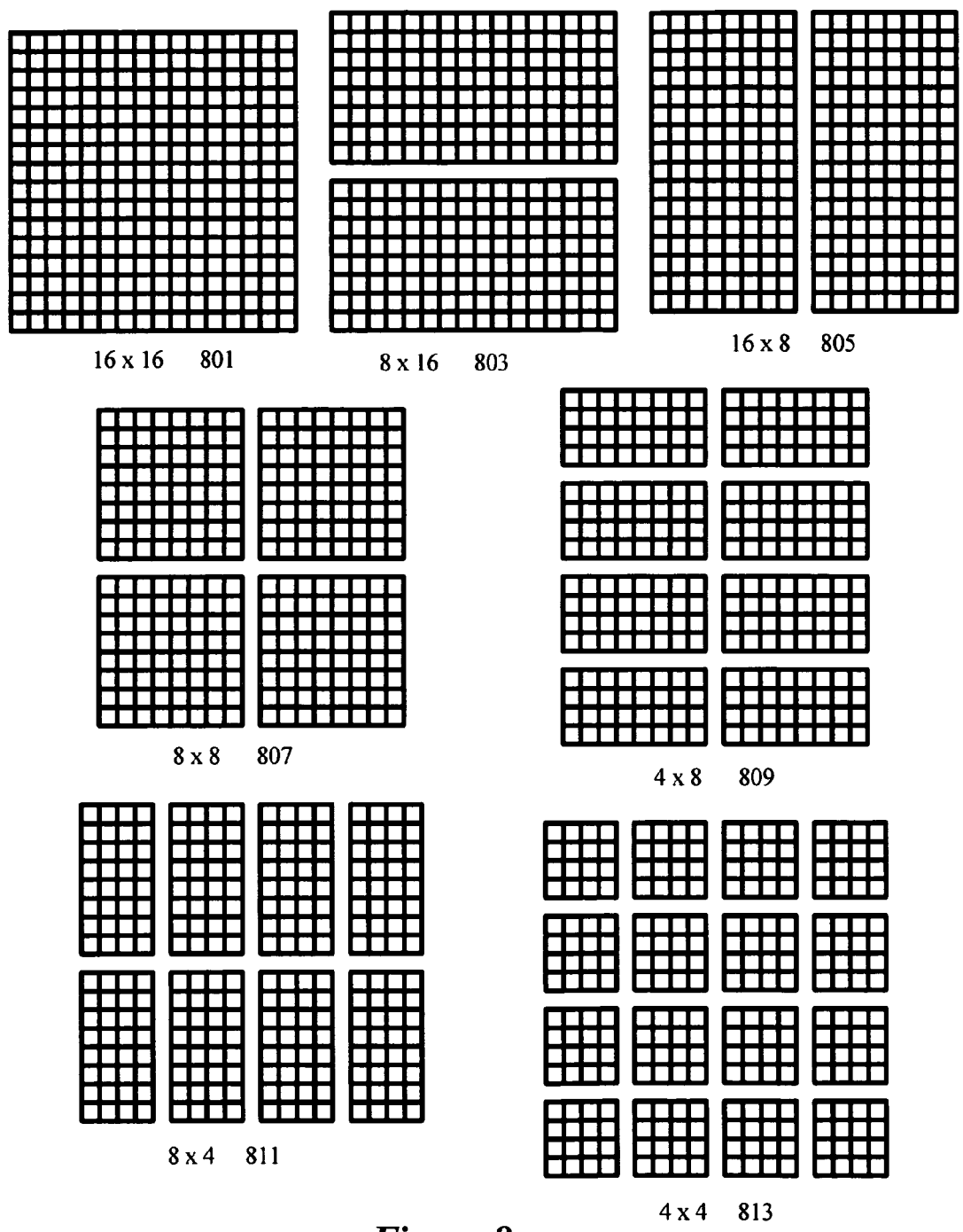
FIG. 8 is a block diagram of macroblock and sub-macroblock partitions in accordance with an embodiment of the present invention.

FIG. 8 is a block diagram of macroblock and sub-macroblock partitions in accordance with an embodiment of the present invention. Macroblock partitions include: 1 of size 16×16 at 801, 2 of size 8×16 at 803, and 2 of size 16×8 at 805. Sub-macroblock partitions include: 4 of size 8×8 at 807, 8 of size 4×8 at 809, 8 of size 8×4 at 811, and 16 of size 4×4 at 813.

Figure 9:
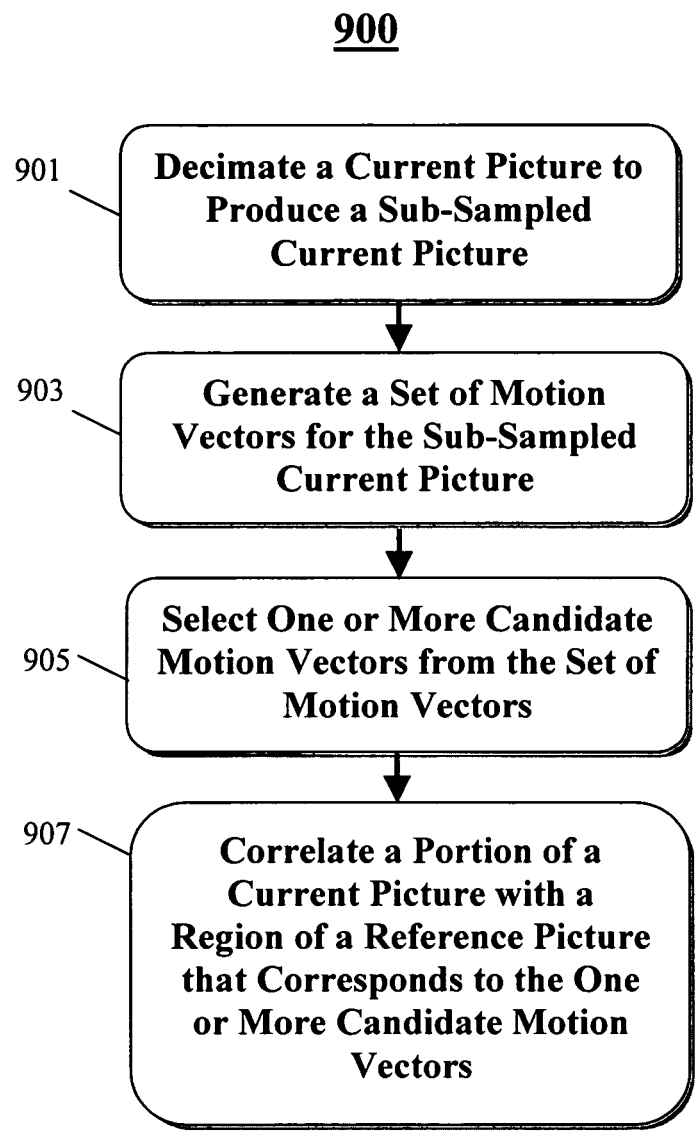
FIG. 9 is a flow diagram of an exemplary method for motion estimation in accordance with an embodiment of the present invention.

FIG. 9 is a flow diagram of an exemplary method for motion estimation in accordance with an embodiment of the present invention. Decimate a current picture to produce a sub-sampled current picture at 901. A decimation engine can sub-sample frames using a 2×2 pixel average. Typically, a coarse motion estimator operates on macroblocks of size 16×16. After sub-sampling, the size is 8×8 for the luma grid and 4×4 for the chroma grids. Fields of size 16×8 can be sub-sampled in the horizontal direction. A 16×8 field partition could be evaluated as size 8×8.

Generate a set of motion vectors for the sub-sampled current picture at 903. In coarse motion estimation, a motion vector is a representation of the displacement from the sub-sampled current picture to a sub-sampled reference picture. Motion vector based on sub-sampled pictures can have integer pel resolution. A costing engine can determine a cost based on a sum of absolute difference (SAD). The output of the costing engine is one motion vector for every reference picture and macroblock combination.

Select one or more candidate motion vectors from the set of motion vectors at 905. The one or more candidate motion vectors are associated with a current macroblock and up to eight neighboring macroblocks.

Correlate a portion of a current picture with a region of a reference picture that corresponds to the one or more candidate motion vectors at 907. A refinement engine can search all partitions of the current macroblock and take advantage of various small partition sizes with this multiple candidate approach. A motion mode evaluator makes estimation mode decisions and outputs data that includes the motion vectors and associated reference indices for each macroblock, macroblock partition and sub-macroblock partition. The motion mode evaluator can also indicate uni-directional or bi-directional modes.

The embodiments described herein may be implemented as a board level product, as a single chip, application specific integrated circuit (ASIC), or with varying levels of a video classification circuit integrated with other portions of the system as separate components. An integrated circuit may store a supplemental unit in memory and use an arithmetic logic to encode, detect, and format the video output.

The degree of integration of the video classification circuit will primarily be determined by the speed and cost considerations. Because of the sophisticated nature of modern processors, it is possible to utilize a commercially available processor, which may be implemented external to an ASIC implementation.

If the processor is available as an ASIC core or logic block, then the commercially available processor can be implemented as part of an ASIC device wherein certain functions can be implemented in firmware as instructions stored in a memory. Alternatively, the functions can be implemented as hardware accelerator units controlled by the processor.

While the present invention has been described with reference to certain embodiments, it will be understood by those skilled in the art that various changes may be made and equivalents may be substituted without departing from the scope of the present invention.

Additionally, many modifications may be made to adapt a particular situation or material to the teachings of the present invention without departing from its scope. For example, although the invention has been described with a particular emphasis on MPEG-1 encoded video data, the invention can be applied to a video data encoded with a wide variety of standards.

Therefore, it is intended that the present invention not be limited to the particular embodiment disclosed, but that the present invention will include all embodiments falling within the scope of the appended claims.

The invention claimed is:

1. A method for motion estimation in a video encoder, said method comprising:
   sub-sampling a current picture, wherein sub-sampling comprises:
      decimating the current picture by averaging adjacent pixels, thereby producing the sub-sampled current picture; and
      correlating a sub-sampled current picture with a sub-sampled reference picture, thereby producing a first set of motion vectors in said video encoder;
   selecting one or more candidate motion vectors from the first set of motion vectors;
   correlating a portion of a current picture with a region of a reference picture, wherein the region of the reference picture corresponds to the one or more candidate motion vectors;
   producing a second set of motion vectors in response to correlating the portion of the current picture with the region of the reference picture; and
   producing costs associated with the second set of motion vectors.

2. The method of claim 1, further comprising:
   decimating the reference picture by averaging adjacent pixels, thereby producing the sub-sampled reference picture.

3. The method of claim 1, wherein correlating the portion of the current picture with the region of the reference picture further comprises:
   evaluating a cost for estimating the portion of the current picture with a portion of the reference picture; wherein the portion of the reference picture is within the region of the reference picture that corresponds to the one or more candidate motion vectors.

4. The method of claim 1, wherein the region of the reference picture comprises:
   a set of pixels in the reference picture with coordinates corresponding to the portion of the current picture; and
   for each particular motion vector in the one or more candidate motion vectors, a set of pixels in the reference picture with coordinates corresponding to the portion of the current picture offset by the particular motion vector.

5. The method of claim 4, wherein the region of the reference picture also comprises pixels near the sets of pixels.

6. The method of claim 1, wherein costs are produced for the second set of motion vectors by interpolating the current picture.

7. A system for motion estimation in a video encoder, said system comprising:
   a coarse motion estimator for generating a search region within a reference picture, wherein the coarse motion estimator further comprises:
      a decimation engine for sub-sampling a current picture and sub-sampling the reference picture, wherein sub-sampling further comprises:

decimating the reference picture by averaging adjacent pixels, thereby producing a sub-sampled reference picture; and a coarse search engine for evaluating a correlation between a sub-sampled current picture and the sub-sampled reference picture and producing a set of motion vectors;

wherein one or more motion vectors of the set of motion vectors, associated with a macroblock containing a portion of the current picture, define the search region;

a fine motion estimator for correlating the portion of a current picture with the search region; and a motion mode evaluator configured to make a sub-macroblock partition mode decision for each reference picture; before a uni-directional prediction among multiple reference pictures.

8. The system of claim 7, wherein the portion of the current picture is a macroblock partition.

9. The system of claim 7, further comprising:
decimating the reference picture by averaging adjacent pixels, thereby producing the sub-sampled reference picture.

10. The system of claim 7, further comprising a costing engine to determine a cost for the set of motion vectors that describe a displacement from a section of the sub-sampled reference picture to a macroblock in the sub-sampled current picture.

11. The system of claim 7, wherein the set of motion vectors correspond to the macroblock and neighboring macroblocks.

12. The system of claim 7, wherein the fine motion estimator correlates a portion of the sub-sampled current picture with the search region.

13. The system of claim 7, wherein the coarse search engine is non-synchronous with the fine motion estimator.

14. The system of claim 7, further comprising a motion mode evaluator configured to make mode decisions in the following order:

a) a sub-macroblock partition mode for each reference picture,
b) a uni-directional prediction among multiple reference pictures,
c) a bi-direction prediction among reference picture pairs,
d) an overall prediction between uni-direction and bi-direction predictions, and
e) a macroblock partition mode.

15. The system of claim 7, wherein the motion mode evaluator is configured to make a uni-directional prediction among multiple reference pictures before a bi-direction prediction among reference picture pairs.

16. The system of claim 15, wherein the motion mode evaluator is configured to make a bi-direction prediction among reference picture pairs before an overall prediction between uni-direction and bi-direction predictions.

17. The system of claim 16, wherein the motion mode evaluator is configured to make an overall prediction between uni-direction and bi-direction predictions before a macroblock partition mode decision.

18. An integrated circuit for video encoding, said integrated circuit comprising:

a memory for storing a current picture and a reference picture, wherein the current picture comprises a macroblock partition; and a circuit operable for:
decimating the current picture by averaging neighboring pixels, thereby producing a sub-sampled current picture;
determining a search region in the reference picture by averaging neighboring pixels based on the sub-sampled current picture; and correlating the macroblock partition with the search region;
interpolating a portion of the search region, thereby producing an interpolated reference; and
evaluating a cost for estimating an interpolated macroblock partition with the interpolated reference.

* * * * *